J. F. GEBHART.

Assignor to G. CROMPTON.

Harness-Motions for Looms.

No. 8,685. Reissued April 22, 1879.

Witnesses.

S. F. Connor

N. E. Whitney.

Inventor.

John F. Gebhart by Crosby & Gregory Attys

UNITED STATES PATENT OFFICE.

F. GEBHART, OF NEW ALBANY, INDIANA, ASSIGNOR TO GEORGE CROMPTON.

IMPROVEMENT IN HARNESS-MOTIONS FOR LOOMS.

Specification forming part of Letters Patent No. 66,828, dated July 16, 1867; Reissue No. 8,685, dated April 22, 1879; application filed December 14, 1878.

*To all whom it may concern:*

Be it known that I, J. F. GEBHART, of New Albany, in the county of Floyd, and in the State of Indiana, have invented certain new and useful Improvements in Looms; and I do hereby declare that the following is a full, clear, and exact description thereof, reference being had to the accompanying drawings, and to the letters of reference marked thereon, making a part of this specification.

Figure 1:
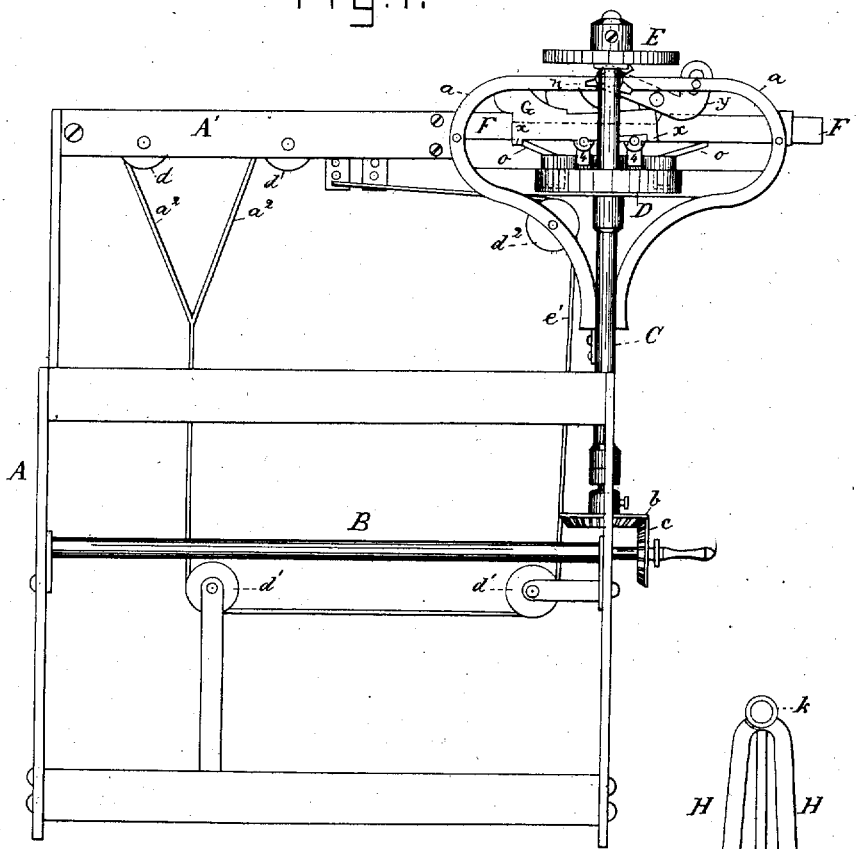
Figure 3:
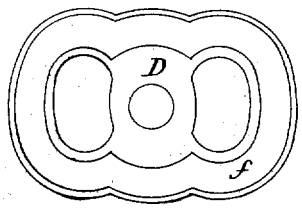
Figure 2:
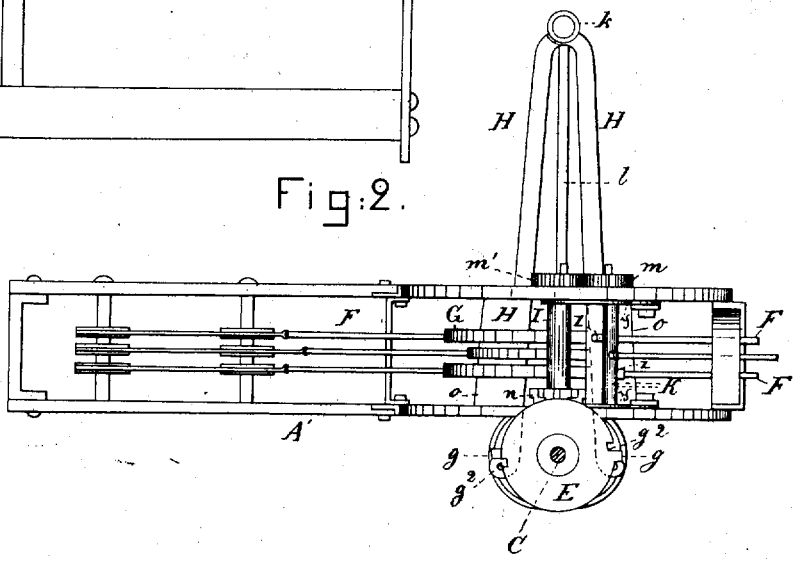

Figure 1 represents a front elevation; Fig. 2, a plan view of the sheave-frame; and Fig. 3, a plan view of a cam.

My invention relates to the manner of operating the heddle-frames in looms, whereby any number, from two to twenty-four, may be used for weaving fancy twilled or plain cloth.

In the annexed drawings, A represents the ordinary frame of a loom with the sheave-frame A′ elevated above it.

At one end of the frame is placed a metallic upright, connected with which are two oblong bows, *a a*, which support the connectors F, that operate the heddle-frames.

The rotating cross-shaft B of the loom has at one end of it a bevel-gear, *c*, which imparts motion to a bevel-gear, *b*, at the end of, and rotates the vertical shaft C, located at the side of, the loom.

This shaft C is provided with a cam, D, having a groove, *f*, (see Fig. 3,) which receives pins or studs at the front ends of the jack-movers H H, which, at their opposite ends, are pivoted at *k* upon a projection, *l*, extended from the loom-frame.

The jack-movers H have their edges inclined, as represented at *o*, so as to readily engage the projections *x* of the jacks G, which are pivoted, as shown at Fig. 1, upon the connectors F, which are joined by suitable cords with the usual harness-frames.

The shaft C is also provided with a wheel, E, having projecting teeth *g* and next the teeth notches $g^2$.

The pattern-cylinder moving-shaft I has at one end a spur-wheel, *n*, the teeth of which are engaged by the teeth *g* of wheel E.

As the shaft I is rotated, it, through its pinion *m′*, engages a pinion, *m*, on and rotates the pattern-cylinder K, provided with a series of pins, *z*, which, at the proper times, act upon the rear ends of the jacks G to depress them in order that the projections *x* at the rear of the said jacks may be engaged by one of the jack-movers.

As shown in the drawings, the forward ends of the jacks are weighted to keep depressed the forward ends of such jacks of the series of jacks (there being one jack upon each connector F) which are not then acted upon by the pins of the pattern-cylinder.

The pattern-cylinder has its journals supported by adjustable arms *y* at each end of it, the said arms being pivoted to the bows *a a*, and slotted to regulate the bearing of the pins *z* upon the jacks.

Actuating the heddle-frames and pattern-cylinder from a vertical shaft at the loom side, the shaft being set in motion by the crank-shaft, and the pattern-cylinder being moved by toothed gearing, makes a compact and simple contrivance, and avoids the use of eccentrics and links and pawls and ratchets, as in earlier forms of looms.

Each heddle-frame connector, placed at the top of the loom-frame, out of the way, has two cords attached to it at different places above the level of the crank-shaft. One of said cords, $a^2$, extends over sheaves *d* at the top of the loom-frame, while the other, *e′*, passes under sheaves *d′* below the crank-shaft; but before passing under the sheave, which acts to cause the cord *e′* to pull down upon the heddle-frame in a straight line, this cord has to be passed about a directing-sheave, $d^2$, which acts to maintain the cord *e′* in substantially a vertical position.

In other looms where single levers have been used with their opposite ends above and below the level of the crank-shaft, as in the Green loom, but a single set of sheaves have been employed below the crank-shaft, for the lower ends of the levers being below the crank-shaft do not pull the lower cord as when the end of the connector with which it is attached is above the crank-shaft.

I claim—

1. The combination, with jacks, connectors to move the heddle-frames, two independent jack-movers, pattern-cylinder, and crank-shaft, of a vertically-rotating shaft at the loom side, and devices carried by the said vertical shaft to actuate both of the said jack-movers and the pattern-cylinder, substantially as described.

2. The connectors F F F and jacks G, combined with the jack-movers H H and cam D, for the purposes specified.

J. F. GEBHART.

Witnesses:

ALEXANDER DOWLING,
A. W. BENTLEY.